(12) United States Patent
Kishimoto

(10) Patent No.: US 11,642,893 B2
(45) Date of Patent: May 9, 2023

(54) IMAGE FORMING APPARATUS CAPABLE OF PERFORMING PROCESSES IN ACCORDANCE WITH OPERATION MODE SET THEREFOR

(71) Applicant: BROTHER KOGYO KABUSHIKI KAISHA, Nagoya (JP)

(72) Inventor: Noriaki Kishimoto, Aichi-ken (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 267 days.

(21) Appl. No.: 17/173,398

(22) Filed: Feb. 11, 2021

(65) Prior Publication Data

US 2021/0252869 A1 Aug. 19, 2021

(30) Foreign Application Priority Data

Feb. 19, 2020 (JP) .............................. JP2020-025863

(51) Int. Cl.
*B41J 2/175* (2006.01)
*G06Q 10/08* (2012.01)
*G06Q 10/087* (2023.01)

(52) U.S. Cl.
CPC ....... *B41J 2/17546* (2013.01); *B41J 2/17523* (2013.01); *B41J 2/17566* (2013.01); *G06Q 10/087* (2013.01); *B41J 2002/17589* (2013.01)

(58) Field of Classification Search
CPC .. B41J 2/17523; B41J 2/17546; B41J 2/1756; B41J 2002/17589; G06Q 10/087
See application file for complete search history.

(56) References Cited

FOREIGN PATENT DOCUMENTS

| JP | 101009813 | * | 8/2007 | ........... G06F 3/1423 |
| WO | 2014/120199 A1 | | 8/2014 | |

* cited by examiner

*Primary Examiner* — Anh T Vo
(74) *Attorney, Agent, or Firm* — Merchant & Gould P.C.

(57) ABSTRACT

An image forming apparatus includes: a main casing; a supply cartridge attachable to the main casing; a printing mechanism; a display; and a controller configured to perform: determining, based on information inputted into the controller, whether an agreement is made for the image forming apparatus; setting, when an agreement is made for the image forming apparatus, an operation mode for the image forming apparatus to a pre-contract mode; determining under the pre-contract mode whether a type of the supply cartridge attached to the main casing is a normal type or a subscription type; displaying, when the type of the supply cartridge attached to the main casing is the normal type, information related to the pre-contract mode on the display; and setting, when the type of the supply cartridge attached to the main casing is the subscription type, the operation mode from the pre-contract mode to a formal contract mode.

21 Claims, 9 Drawing Sheets

| USER | DEVICE INFORMATION | PAYMENT INFORMATION | ADDRESS | OPERATION MODE | ACCUMULATED PRINTED PAGE NUMBER FOR BILLING |
|---|---|---|---|---|---|
| ○○○ | 123456 | (CREDIT CARD, BANK ACCOUNT OR THE LIKE) | 〒xxx-xxxx... | PRE-CONTRACT MODE | 103456 |
| ○○○ | 213456 | (CREDIT CARD, BANK ACCOUNT OR THE LIKE) | 〒xxx-xxxx... | PRE-CONTRACT MODE | 130 |
| ○○○ | 151356 | (CREDIT CARD, BANK ACCOUNT OR THE LIKE) | 〒xxx-xxxx... | FORMAL CONTRACT MODE | 2039 |

IMAGE FORMING APPARATUS CAPABLE OF PERFORMING PROCESSES IN ACCORDANCE WITH OPERATION MODE SET THEREFOR

CROSS REFERENCE TO RELATED APPLICATION

This application claims priority from Japanese Patent Application No. 2020-025863 filed Feb. 19, 2020. The entire content of the priority application is incorporated herein by reference.

TECHNICAL FIELD

The present disclosure relates to an image forming apparatus, an image forming system, and a method of controlling the image forming apparatus.

BACKGROUND

In recent years, cartridges for use with image forming apparatuses are provided to users through a subscription service. For example, prior art describes a service that uses a server to manage cartridge usage for subscription in an image forming apparatus. Specifically, the server issues credit the image forming apparatus based on a user's payment. Upon receiving a print job, the image forming apparatus checks the remaining credit therefor to determine whether printing operation using subscription cartridges can be performed. When determining that printing operation is not allowed based on an amount of the remaining credit, the image forming apparatus requests the user to replace the subscription cartridge with a commercial cartridge or to add credit.

SUMMARY

The image forming apparatus described in the prior art enters a subscription mode to permit use of the subscription cartridge when credit is issued, even when a commercial cartridge is attached to the image forming apparatus. Consequently, if the image forming apparatus receives a print request while the commercial cartridge is attached thereto, the image forming apparatus would execute the print job using the commercial cartridge without issuing any notification to the user. In such cases, it is difficult in the conventional image forming apparatus to prompt the user to replace the current commercial cartridge with a subscription cartridge at a suitable timing either before or after the image forming apparatus enters the subscription mode.

In view of the foregoing, it is an object of the present disclosure to provide a technique for prompting a contracted user at a suitable timing to use a subscription type supply cartridge.

In order to attain the above and other object, according to one aspect, the present disclosure provides an image forming apparatus including: a main casing; a supply cartridge; a printing mechanism; a display; and a controller. The supply cartridge is attachable to the main casing. The supply cartridge includes a supply cartridge memory storing therein type information indicative of a type of the supply cartridge which is one of a normal type and a subscription type. The printing mechanism is configured to perform a printing process using the supply cartridge. The controller is configured to perform processes in accordance with an operation mode for the image forming apparatus. The operation mode is configured to be set to one of a pre-contract mode and a formal contract mode. The controller is configured to perform: first determining, based on information inputted into the controller, whether an agreement is made for the image forming apparatus; first setting, when the first determining determines that an agreement is made for the image forming apparatus, the operation mode to the pre-contract mode; second determining which of the normal type and the subscription type the type of the supply cartridge attached to the main casing is; displaying, when the second determining determines that the type of the supply cartridge attached to the main casing is the normal type while the operation mode is set to the pre-contract mode, display information related to the pre-contract mode on the display; and second setting, when the second determining determines that the type of the supply cartridge attached to the main casing is the subscription type while the operation mode is set to the pre-contract mode, the operation mode from the pre-contract mode to the formal contract mode.

According to another aspect, the present disclosure provides an image forming system including: an image forming apparatus; and a communication apparatus that can communicate with the image forming apparatus via an Internet. The image forming apparatus includes: a main casing; a supply cartridge; a printing mechanism; a display; a communication interface; and a controller. The supply cartridge is attachable to the main casing. The supply cartridge includes a supply cartridge memory storing therein type information indicative of a type of the supply cartridge which is one of a normal type and a subscription type. The printing mechanism is configured to perform a printing process using the supply cartridge. The communication interface is configured to communicate with the communication apparatus. The controller is configured to perform processes in accordance with an operation mode for the image forming apparatus. The operation mode is configured to be set to one of a pre-contract mode and a formal contract mode. The communication apparatus is configured to perform: transmitting to the controller agreement information indicating that an agreement is made for the image forming apparatus. The controller is configured to perform: setting, based on the agreement information received from the communication apparatus, the operation mode to the pre-contract mode; first determining which of the normal type and the subscription type the type of the supply cartridge attached to the main casing is; displaying, when the first determining determines that the type of the supply cartridge attached to the main casing is the normal type while the operation mode is set to the pre-contract mode, display information related to the pre-contract mode on the display; and setting, when the first determining determines that the type of the supply cartridge attached to the main casing is the subscription type while the operation mode is set to the pre-contract mode, the operation mode from the pre-contract mode to the formal contract mode.

According to still another aspect, the present disclosure provides a method of controlling an image forming apparatus configured to form an image using a supply cartridge. The method includes: first determining whether an agreement is made for the image forming apparatus; setting, when the first determining determines that an agreement is made for the image forming apparatus, an operation mode for the image forming apparatus to a pre-contract mode; second determining which of a normal type and a subscription type a type of the supply cartridge attached to the image forming apparatus is; displaying, when the second determining determines that the type of the supply cartridge attached to the image forming apparatus is the normal type while the operation mode is set to the pre-contract mode, display information related to the pre-contract mode on a display; and setting, when the second determining determines that the type of the supply cartridge attached to the image forming apparatus is the subscription type while the operation mode is set to the pre-contract mode, the operation mode for the image forming apparatus from the pre-contract mode to a formal contract mode.

According to still another aspect, the present disclosure provides an image forming apparatus including: a main casing; a supply cartridge; a printing mechanism; and a controller. The supply cartridge is attachable to the main casing. The supply cartridge includes a supply cartridge memory storing therein type information indicative of a type of the supply cartridge which is one of a normal type and a subscription type. The printing mechanism is configured to perform a printing process using the supply cartridge. The controller is configured to perform processes based on an operation mode set for the image forming apparatus. The operation mode is configured to be set to one of a normal mode and a contract mode. The controller is configured to perform one of: setting the operation mode from the normal mode to the contract mode based on a command received from a server via a network; and setting the operation mode from the normal mode to the contract mode based on the type information stored in the supply cartridge memory of the supply cartridge attached to the main casing.

According to still another aspect, the present disclosure provides a method of controlling an image forming apparatus configured to form an image using a supply cartridge. The method includes: performing one of: setting an operation mode for the image forming apparatus from a normal mode to a contract mode based on a command received from a server via a network; and setting the operation mode for the image forming apparatus from the normal mode to the contract mode based on type information indicative of a type of the supply cartridge which is one of a normal type or a subscription type.

BRIEF DESCRIPTION OF THE DRAWINGS

The particular features and advantages of the embodiment (s) as well as other objects will become apparent from the following description taken in connection with the accompanying drawings, in which:

FIG. 5 is a table illustrating an example of management information in a contract management server in the image forming system according to the embodiment;

DETAILED DESCRIPTION

Figure 1:
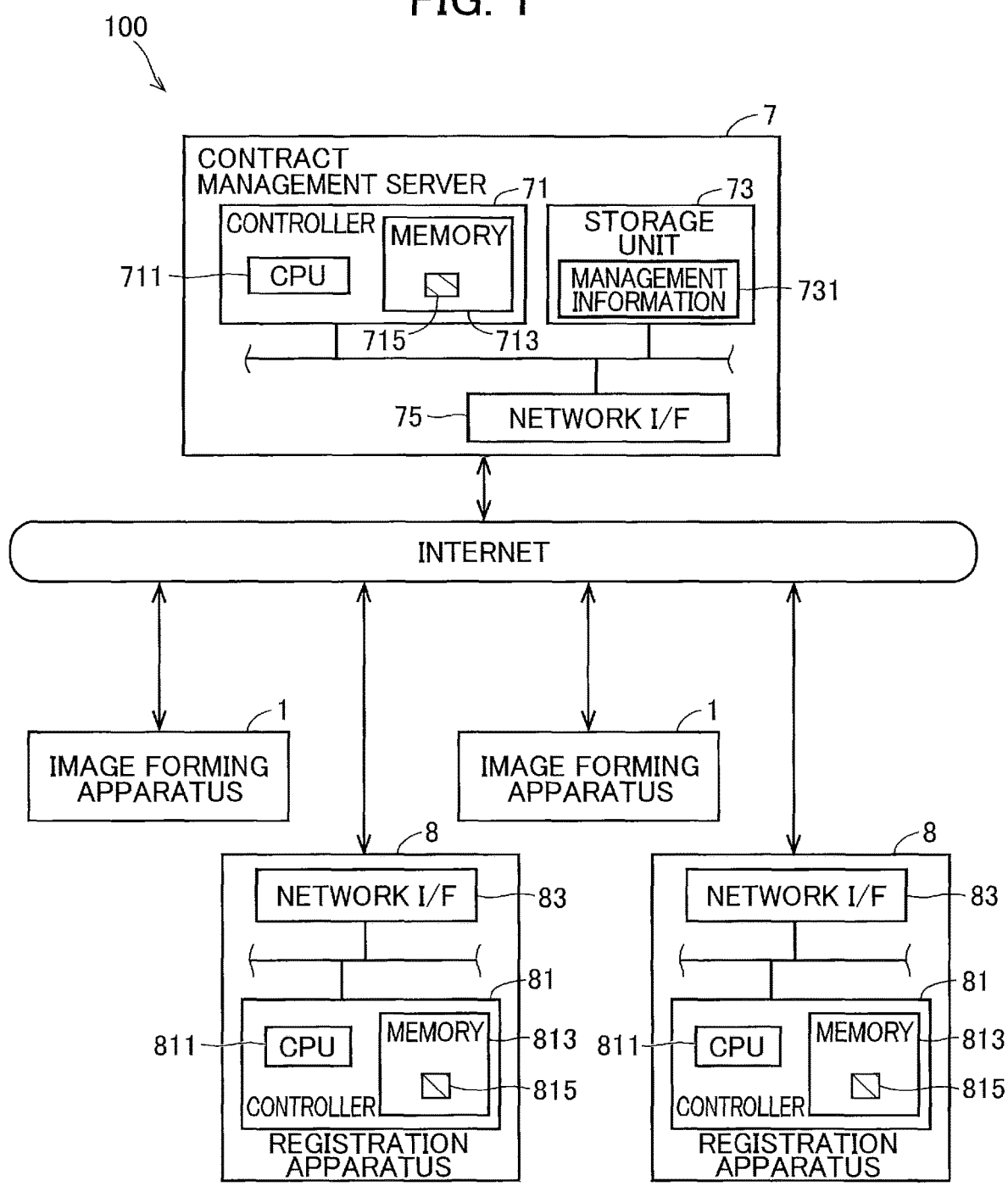
FIG. 1 is a diagram illustrating an image forming system according to one embodiment of the present disclosure.

Hereinafter, one embodiment of the present disclosure will be described while referring to the accompanying drawings. Note that parts and components described in the embodiment are merely an example, and the parts and components according to the embodiment should not be considered to limit the present disclosure. In the drawings, for facilitate understanding, dimensions and the number of each part may be simplified as necessary.

1. Embodiment

FIG. 1 is a diagram illustrating an image forming system 100 according to the embodiment. The image forming system 100 includes a plurality of image forming apparatuses 1, a contract management server 7 as an example of a communication apparatus, and a plurality of registration apparatuses 8. The image forming apparatus 1 and the contract management server 7 are connected to each other via an Internet so as to communicate each other. As illustrated in FIG. 1, the contract management server 7 can communicate with a plurality of image forming apparatuses 1 via the Internet. Also, the contract management server 7 and the registration apparatuses 8 are connected to each other via the Internet so that the contract management server 7 and the registration apparatuses 8 can communicate with each other.

In the image forming system 100, a user of each image forming apparatus 1 enters an agreement with a supplier of supply cartridges. The supply cartridges are parts used in printing processes on the image forming apparatus 1 and include replaceable parts and consumable cartridges. The replaceable parts are parts that should be occasionally replaced due to wear or degradation through use. The replaceable parts are, for example, a drum cartridge 20 and a transfer unit 40 (a transfer belt 41) described later. The consumable cartridges are parts that supply materials consumed during printing processes, such as a toner cartridge 30 described later. The concept of a supplier includes a manufacturer or a vendor of supply cartridges, for example. In the following description, the toner cartridge 30 is used as an example of the supply cartridges.

In the agreement, printing fees that the user have to pay for using the supply cartridges are set, for example. Specifically, fees may be set based on the number of pages printed; an amount of toner used in each color; which of monochromatic printing or color printing is performed; printing resolution; or a size of printing papers. To calculate fees, a flat-rate system or a measured-rate system may be employed.

In a flat-rate system, the user pays a fixed rate so that the user is permitted to print a preset number of pages over a prescribed time period (one month, for example). In a measured-rate system, the user pays fees based on a printing amount. Alternatively, the user may pay a flat rate up to a preset printing amount but, when exceeding the preset printing amount, be required to pay a surcharge that corresponds to the excessive amount.

The contract management server 7 is a device that performs information management related to the contracted user, management of charge and payment, and management regarding the provision of services to the contracted user. Services provided to contracted user include a service for shipping toner cartridges 30 to the user. The contract management server 7 includes a controller 71, a storage unit 73, and a network interface 75. Note that the term "interface" is abbreviated as "I/F" in the drawings. The controller 71 is electrically connected to the storage unit 73 and the network interface 75 by bus lines.

The controller 71 includes a CPU 711 and a memory 713. The memory 713 is a storage medium from which information is readable and to which information is writable. An ROM or an EEPROM can be employed as the memory 713. The memory 713 stores therein a program 715. The controller 71 executes various processes by operating the CPU 711 in accordance with the program 715. The storage unit 73 is a hard disk drive or other storage device and configured to store therein management information 731. The management information 731 includes information related to contracted users, information related to image forming apparatuses 1 registered by contracted users, and payment information (information on credit cards, bank accounts, etc. (refer to FIG. 5).

Each registration apparatus 8 is an information terminal used for registering various information into the contract management server 7. Specifically, each registration apparatus 8 may be a portable device such as a smartphone or tablet computer owned by a user wishing to enter an agreement with the supplier, a computer connected to the image forming apparatus 1 via a cable, or an information terminal operated by the supplier or the like.

Each registration apparatus 8 includes a controller 81 and a network interface 83. The controller 81 is connected to the network interface 83 via bus lines or the like. The controller 81 includes a CPU 811 and a memory 813. The memory 813 is a storage medium from which information is readable and to which information writable, such as a flash ROM or an EEPROM. The memory 813 stores therein a program 815. The controller 81 is configured to execute various processes by operating the CPU 811 in accordance with the program 815. The program 815 includes application software for instructing the controller 81 to execute processes to exchange various information with the contract management server 7.

<Configuration of Image Forming Apparatuses>

Figure 2:
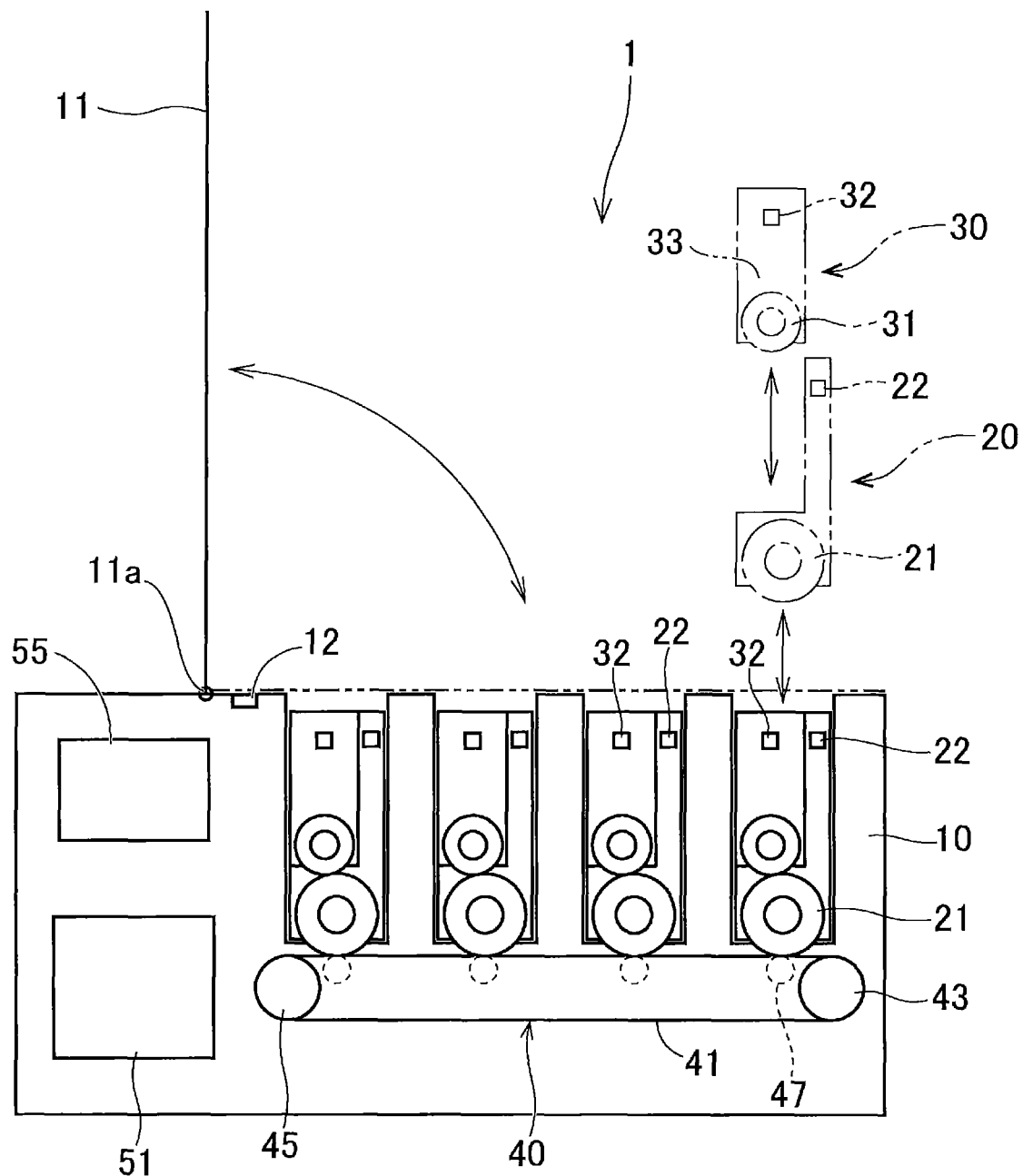
FIG. 2 is a diagram schematically illustrating a configuration of an image forming apparatus according to the embodiment.
Figure 3:
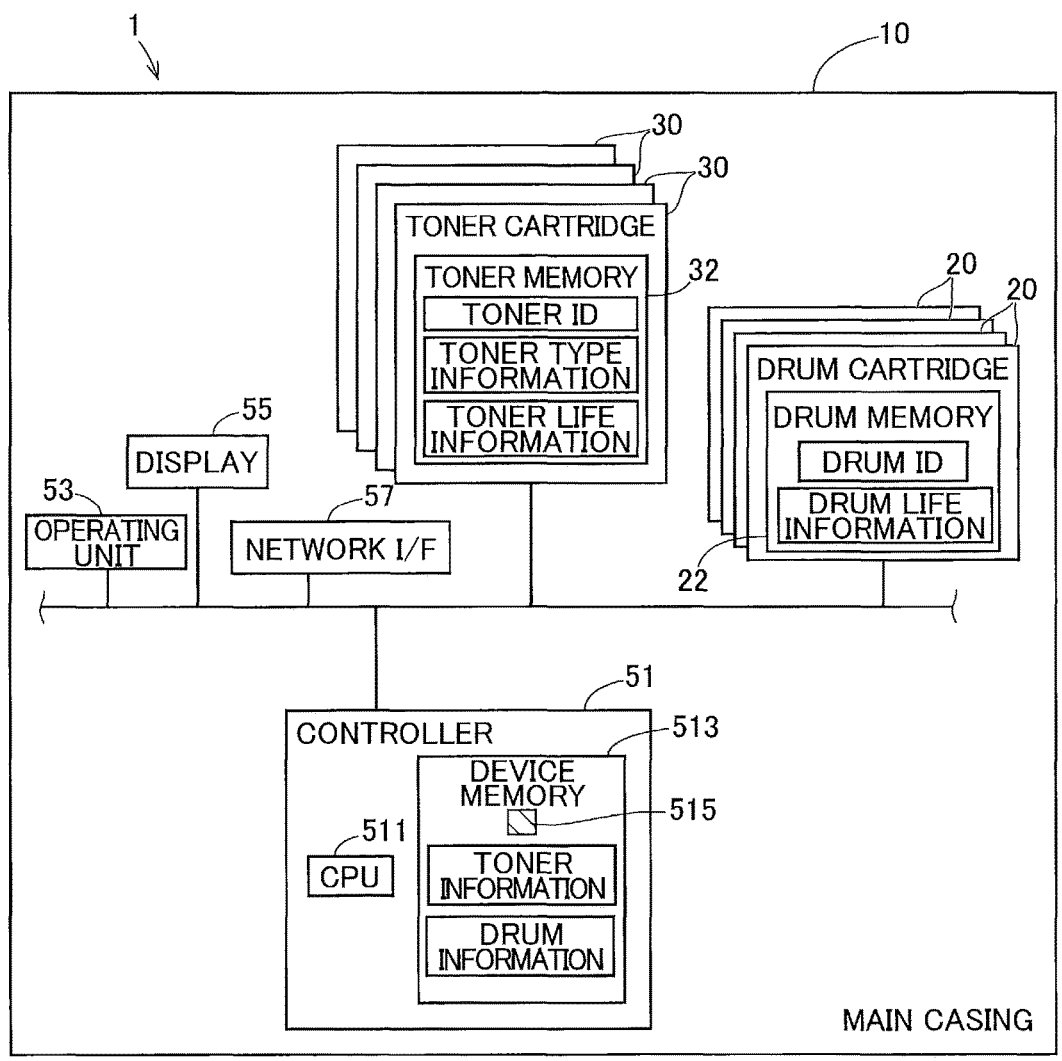
FIG. 3 is a diagram illustrating electrical connection between a controller and other components in the image forming apparatus according to the embodiment.

FIG. 2 is a schematic diagram illustrating a configuration of the image forming apparatus 1 according to the embodiment. FIG. 3 is a diagram illustrating electrical connection between a controller 51 and other components in the image forming apparatus 1.

FIG. 2 illustrates the image forming apparatus 1 that includes a main casing 10, a cover 11, four drum cartridges 20, four toner cartridges 30, four light source units (not illustrated), the transfer unit 40, the controller 51, and a display 55.

The main casing 10 has a rectangular box shape. The four drum cartridges 20, the four toner cartridges 30, the transfer unit 40, and the controller 51 are accommodated in the main casing 10. The four drum cartridges 20 and the four toner cartridges 30 are attached to the main casing 10 and can replaced with new drum cartridges 20 and new toner cartridges 30, respectively. The display 55 is positioned at an outer surface of the main casing 10. The main casing 10 includes a frame for retaining the drum cartridge 20.

The cover 11 is pivotally movable about a rotational shaft 11a extending in a first direction. Specifically, the cover 11 is pivotally movable between an open position (a position indicated by solid lines in FIG. 2) and a closed position (a position indicated by two-dot chain lines). Note that the first direction is a direction in which a rotation axis (a drum axis) of a photosensitive drum 21 extends. A sensor 12 is electrically connected to the controller 51 and positioned at the main casing 10. The sensor 12 is configured to detect movement (open and close) of the cover 11, and to transmit to the controller 51 a signal indicating that movement of the cover 11 is detected.

The drum cartridge 20 includes one photosensitive drum 21. The photosensitive drum 21 is a hollow cylindrical member extending in the first direction, and rotatable about a drum axis extending in the first direction. As illustrated in FIG. 2, each of the drum cartridges 20 further includes a drum memory 22. The drum memory 22 is flash ROM or EEPROM, for example. The drum memory 22 stores therein information related to the drum cartridge 20 to which the drum memory 22 is attached.

The drum cartridge 20 also includes a frame to which one toner cartridge 30 is attachable and from which the toner cartridge 30 is detachable. The drum cartridge 20 to which the toner cartridge 30 is attached is attached to the main casing 10.

The toner cartridge 30 includes a developing roller 31, a toner memory 32 as an example of a supply cartridge memory, and a casing 33. The developing roller 31 is a cylindrically shaped member that extends in the first direction. The developing roller 31 is rotatable about a developing shaft extending in the first direction. The toner memory 32 is a storage medium to which information is writable and from which information is readable, such as a flash ROM or an EEPROM. The toner memory 32 stores therein information related to the toner cartridge 30 to which the toner memory 32 is attached. The casings 33 of the four toner cartridges 30 accommodate therein toner of colors different from one another (cyan, magenta, yellow, and black, for example).

In a state where the cover 11 is in the open position, the drum cartridge 20 to which the toner cartridge 30 is attached is attached to the main casing 10, as illustrated in FIG. 2. Specifically, the drum cartridge 20 to which the toner cartridge 30 is attached is inserted through an opening in the main casing 10 and attached to a cartridge retaining portion of the main casing 10.

The four light source units are attached to an inner surface of the main casing 10. When the drum cartridge 20 to which the toner cartridge 30 is attached is attached to the main casing 10 and the cover 11 is moved to the closed position, the light source units face the surfaces of the corresponding photosensitive drums 21. The light source units can irradiate outer circumferential surfaces of the corresponding photosensitive drums 21 with light. Light sources in the light source units may be lasers or light-emitting diodes (LEDs).

The transfer unit 40 includes the transfer belt 41, a driving roller 43, a driven roller 45, and four transfer rollers 47. The transfer belt 41 is an endless belt that has an annular shape. Each of the photosensitive drums 21 has an outer circumferential surface that can contact an outer peripheral surface of the transfer belt 41. The transfer belt 41 is looped over the driving roller 43 and the driven roller 45. The controller 51 controls the driving roller 43 to be driven to circularly move the transfer belt 41. The driven roller 45 rotates in accordance with the transfer belt 41 that moves by driving of the driving roller 43.

The four transfer rollers 47 are positioned in a space formed inside the annular transfer belt 41. Each of the transfer rollers 47 is a cylindrical shaped member and extends in the first direction. Each of the transfer roller 47 is rotatable about a rotational axis extending in the first direction. An outer circumferential surface of each of the transfer roller 47 is configured of a conductive rubber, for example. A transfer bias is applied to each of the transfer rollers 47.

The transfer rollers 47 are positioned below the corresponding photosensitive drums 21. The transfer belt 41 is interposed between the photosensitive drums 21 and the transfer rollers 47. When a transfer bias is applied to the outer circumferential surface of each of the transfer rollers 47, toners carried on the outer circumferential surfaces of the corresponding photosensitive drums 21 are transferred onto the transfer belt 41, and then the toners transferred onto the transfer belt 41 are further transferred onto a printing paper by transfer mechanism (not illustrated), whereby an image is formed onto the printing paper.

When a printing process is performed in the image forming apparatus 1, the entire outer circumferential surface of the photosensitive drum 21 in the drum cartridge 20 is uniformly charged. The corresponding light source unit irradiates the outer circumferential surface of the photosensitive drum 21 with laser light or LED light based on an image to be printed.

Next, the developing roller 31 deposits toner onto the outer circumferential surface of the corresponding photosensitive drum 21 that was exposed to light. The transfer unit 40 transfers toner carried on the photosensitive drum 21 onto the printing paper. After toner is transferred onto the printing paper, the printing paper passes through a fixing unit (not illustrated), whereby the toner is thermally fixed to the printing paper. The drum cartridge 20 and the transfer unit 40 is an example of a printing mechanism that performs a printing process using the toner cartridges 30.

As illustrated in FIG. 3, the image forming apparatus 1 also includes the controller 51, an operating unit 53, the display 55, and a network interface 57 as an example of a communication interface. The controller 51 includes a CPU 511, and a device memory 513. The device memory 513 stores therein a program 515. The controller 51 is configured to execute various processes by operating the CPU 511 in accordance with the program 515. Note that the controller 51 may include a dedicated circuit such as an ASIC (application specific integrated circuit).

The controller 51 sets an operation mode for the image forming apparatus 1 to one of: a normal mode; a pre-contract mode; and a formal contract mode, and performs processes in accordance with the selected operation mode. As will be described later, the operation mode of the image forming apparatus 1 is set to one of the pre-contract mode and the normal mode based on a setting command received from the contract management server 7. Process details corresponding to each of the normal mode, the pre-contract mode, and the formal contract mode are specified in the program 515.

The formal contract mode is an operation mode in which the controller 51 executes processes in accordance with an agreement made for the image forming apparatus 1. Specifically, while the image forming apparatus 1 is in the formal contract mode, the controller 51 executes a process to transmit the number of printed pages to the contract management server 7. In this way, the contract management server 7 can manage the number of pages printed in the image forming apparatus 1. The pre-contract mode is an operation mode in which the controller 51 executes a process for setting the operation mode to the formal contract mode.

The operating unit 53 is configured of buttons that receives user's operations. The display 55 displays thereon images representing various information. Note that the display 55 may also be configured as a touchscreen that functions as the operating unit 53.

When the four drum cartridges 20 and the four toner cartridges 30 are attached to the main casing 10, the four drum memories 22 and the four toner memories 32 are electrically connected to the controller 51, as illustrated in FIG. 3. Accordingly, the controller 51 can communicate with the drum memories 22 and the toner memories 32.

The drum memory 22 stores therein a drum ID, drum life information, drum type information, drum history information, an on-order flag, and threshold information. The drum ID is identification information for identifying an individual drum cartridge 20, and specifically, is a serial number. The drum life information includes the accumulated number of rotations of the photosensitive drum 21, and the accumulated number of pages printed using the photosensitive drum 21, for example.

The accumulated number of rotations of the photosensitive drum 21 is calculated by incrementing or decrementing the number of rotations for the drum cartridge 20 identified by the drum ID each time the drum cartridge 20 is used for a print job. The accumulated number of pages printed using the photosensitive drum 21 is calculated by incrementing or decrementing the number of printed pages for the drum cartridge 20 identified by the drum ID each time the drum cartridge 20 is used for a print job.

Incidentally, the drum memory 22 may further store therein compatible models for the drum cartridge 20, specification of the drum cartridge 20, information indicating whether or not the drum cartridge 20 is a new product, information indicating whether or not the drum cartridge 20 is a genuine product, error history, and the like.

As illustrated in FIG. 3, the toner memory 32 stores therein a toner ID, toner life information, and toner type information. The toner ID is identification information for identifying an individual toner cartridge 30, and specifically, a serial number. The toner life information is information indicating a remaining life of the toner cartridge 30, and is at least one of an accumulated number of rotations of the developing roller 31, an accumulated number of pages printed using the developing roller 31, and an accumulated number of dots.

The accumulated number of rotations of the developing roller 31 is calculated by incrementing or decrementing the number of rotations for the toner cartridge 30 identified by the toner ID each time a print job is performed using the toner cartridge 30. The accumulated number of pages printed using the developing roller 31 is calculated by incrementing or decrementing the number of printed pages for the toner cartridge 30 identified by the toner ID each time a print job is performed with the toner cartridge 30.

The accumulated number of dots formed using the developing roller 31 is calculated by incrementing or decrementing the number of dots for the toner cartridge 30 identified by the toner ID each time a print job is performed using the toner cartridge 30. Note that the accumulated number of dots corresponds a usage amount of the toner used in a print job. Accordingly, a residual amount of toner in the toner cartridge 30 can be calculated by using a total amount of toner that was accommodated in the casing 33 when the toner cartridge 30 was a new product and the accumulated number of dots.

The toner type information indicates a type of the toner cartridge 30, and specifically is one of: a subscription type and a normal type. Hereinafter, a toner cartridge 30 whose type indicated by the toner type information is "subscription type" will be referred to as a "subscription toner cartridge 30", and a toner cartridge 30 whose type indicated by the toner type information is "normal type" will be referred to as a "normal toner cartridge 30". As described later, the toner type information is used for controlling usage of the toner cartridge 30 in the image forming apparatus 1.

The toner memory 32 may also store therein compatible models for the toner cartridge 30, specification of the toner cartridge 30, information indicating whether or not the toner cartridge 30 is a new product, information indicating whether or not the toner cartridge 30 is a genuine product, and the like.

The controller 51 permits the normal toner cartridge 30 to be used irrespective of the operation mode set for the image forming apparatus 1. That is, when the image forming apparatus 1 uses the normal toner cartridge 30, the controller 51 can execute a printing process regardless the fact that the operation mode for the image forming apparatus 1 is set to the normal mode, the pre-contract mode, or the formal contract mode. On the other hand, the controller 51 prohibits a printing process with the subscription toner cartridge 30 when the operation mode is set to the normal mode, but allows a printing process with the subscription toner cartridge 30 when the operation mode is set to the pre-contract mode or the formal contract mode.

Note that the controller 51 need not entirely prohibit usage of subscription toner cartridge 30 when the operation mode is set to the normal mode, and may permit usage of the subscription toner cartridge 30 under certain conditions. For example, the controller 51 may display a screen on the display 55 prompting replacement of the toner cartridge 30 or may display a warning screen on the display 55 warning that usage of the subscription toner cartridge 30 is a breach of contract.

The device memory 513 is configured to store therein drum information and toner information. The drum information represents each drum cartridge 20 attached to the main casing 10 and specifically includes the drum ID, the drum life information, the drum type information, the drum history information, the on-order flag, and the threshold information. The toner information is information related to each toner cartridge 30 attached to the main casing 10 and specifically includes the toner ID, the toner type information, and the toner life information.

The controller 51 stores various information read from each drum memory 22 in the device memory 513 as the drum information. The controller 51 also stores various information read from each toner memory 32 in the device memory 513 as the toner information. The controller 51 also updates this drum information and toner information as needed. The controller 51 also updates the various information stored in each drum memory 22 and each toner memory 32 based on the updated drum information and toner information.

<Operations in the Image Forming System>

Figure 4:
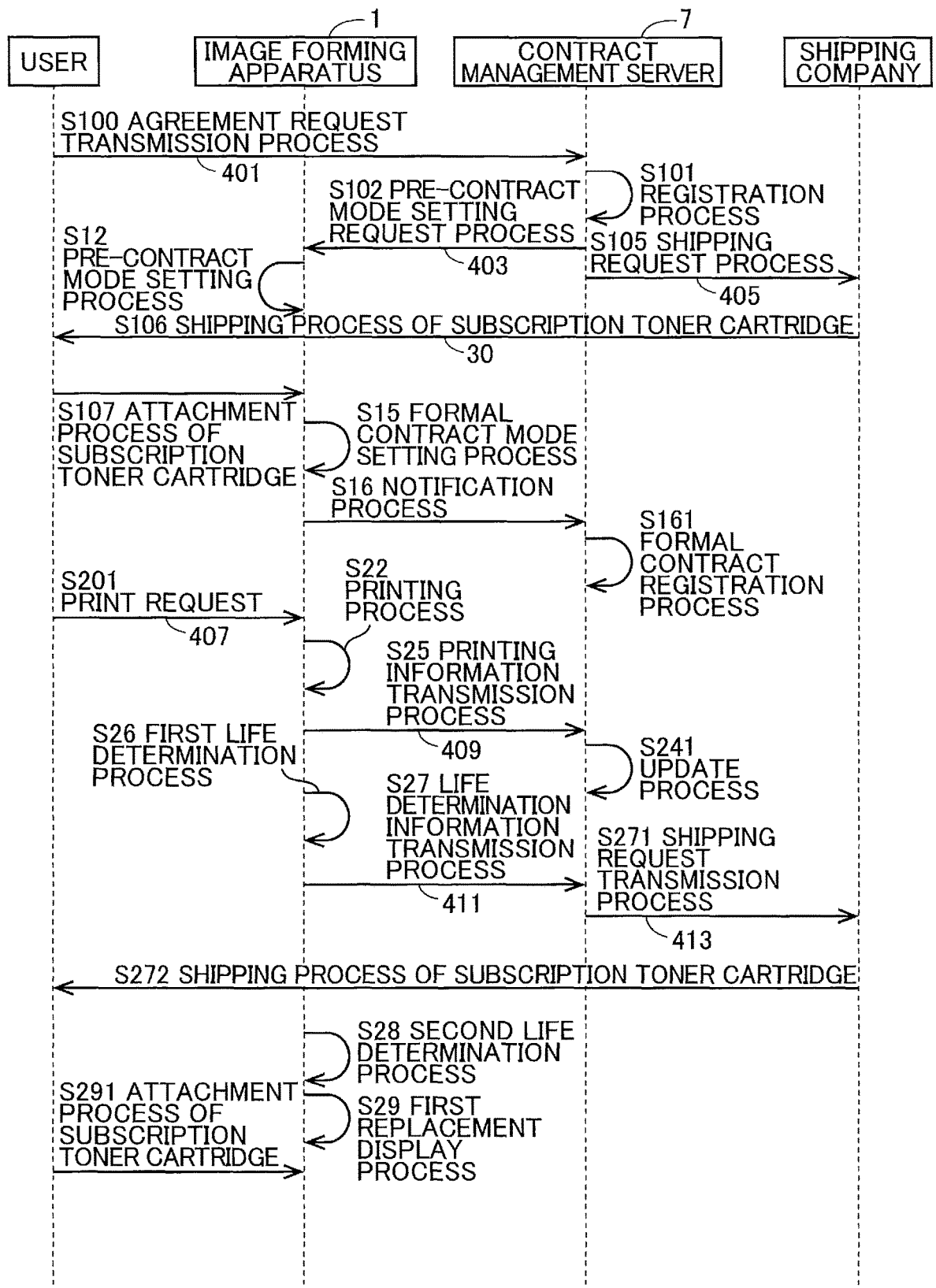
FIG. 4 is a sequence diagram illustrating a process executed in the image forming system according to the embodiment.
Figure 6:
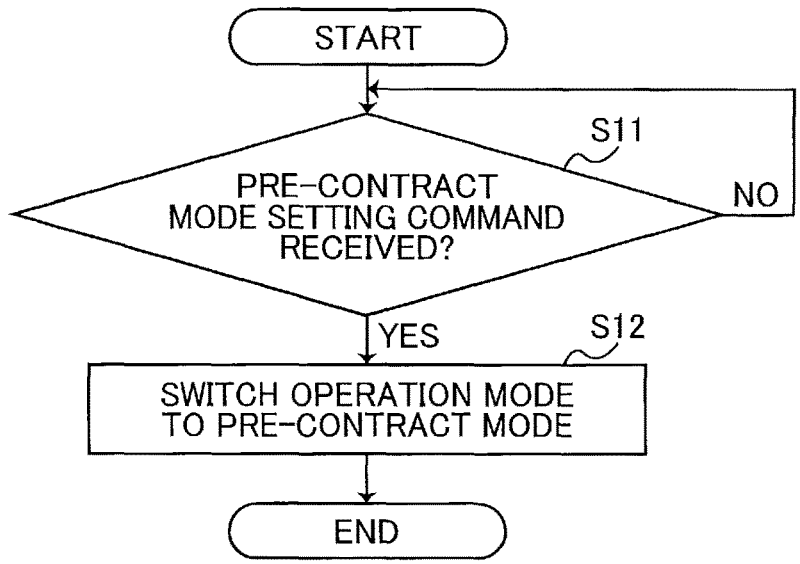
FIG. 6 is a flowchart illustrating steps in a process executed by the controller when the image forming apparatus according to the embodiment is in its normal mode.
Figure 7:
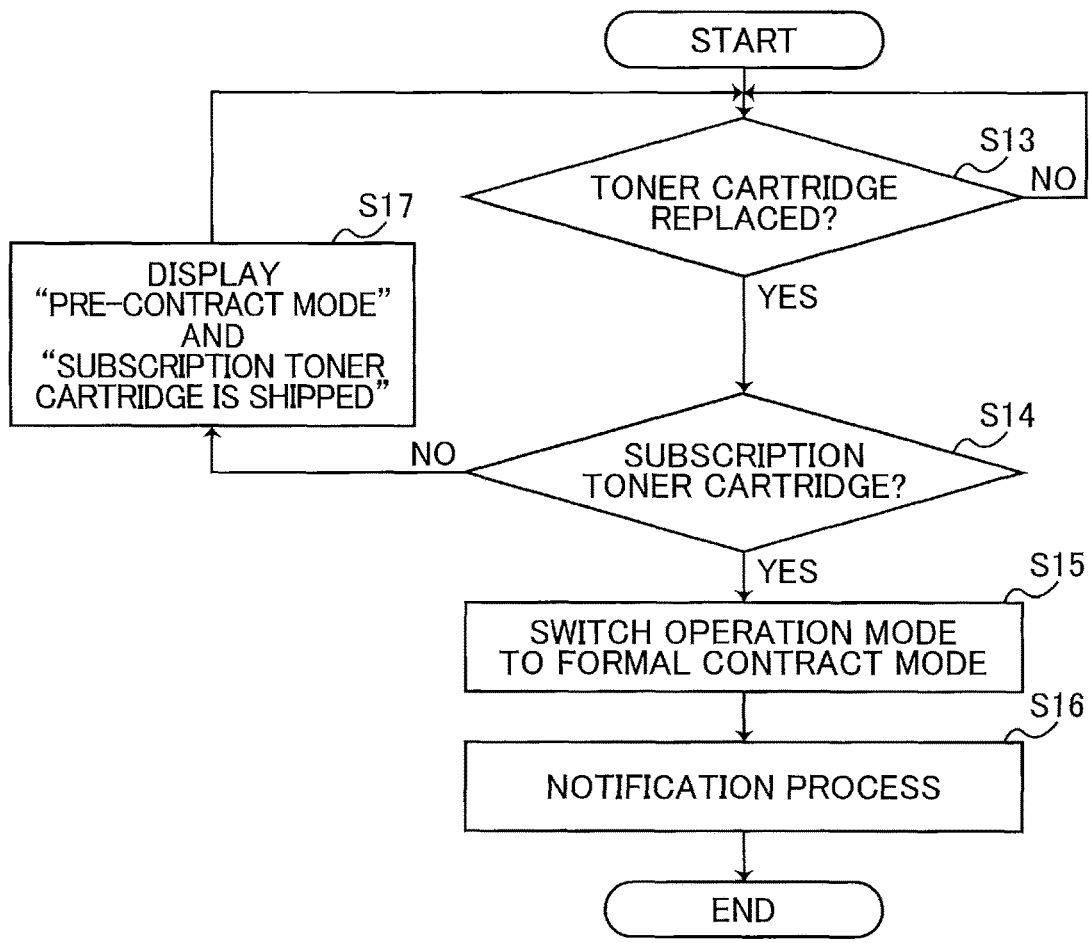
FIG. 7 is a flowchart illustrating steps in a process executed by the controller when the image forming apparatus according to the embodiment is in its pre-contract mode.
Figure 8:
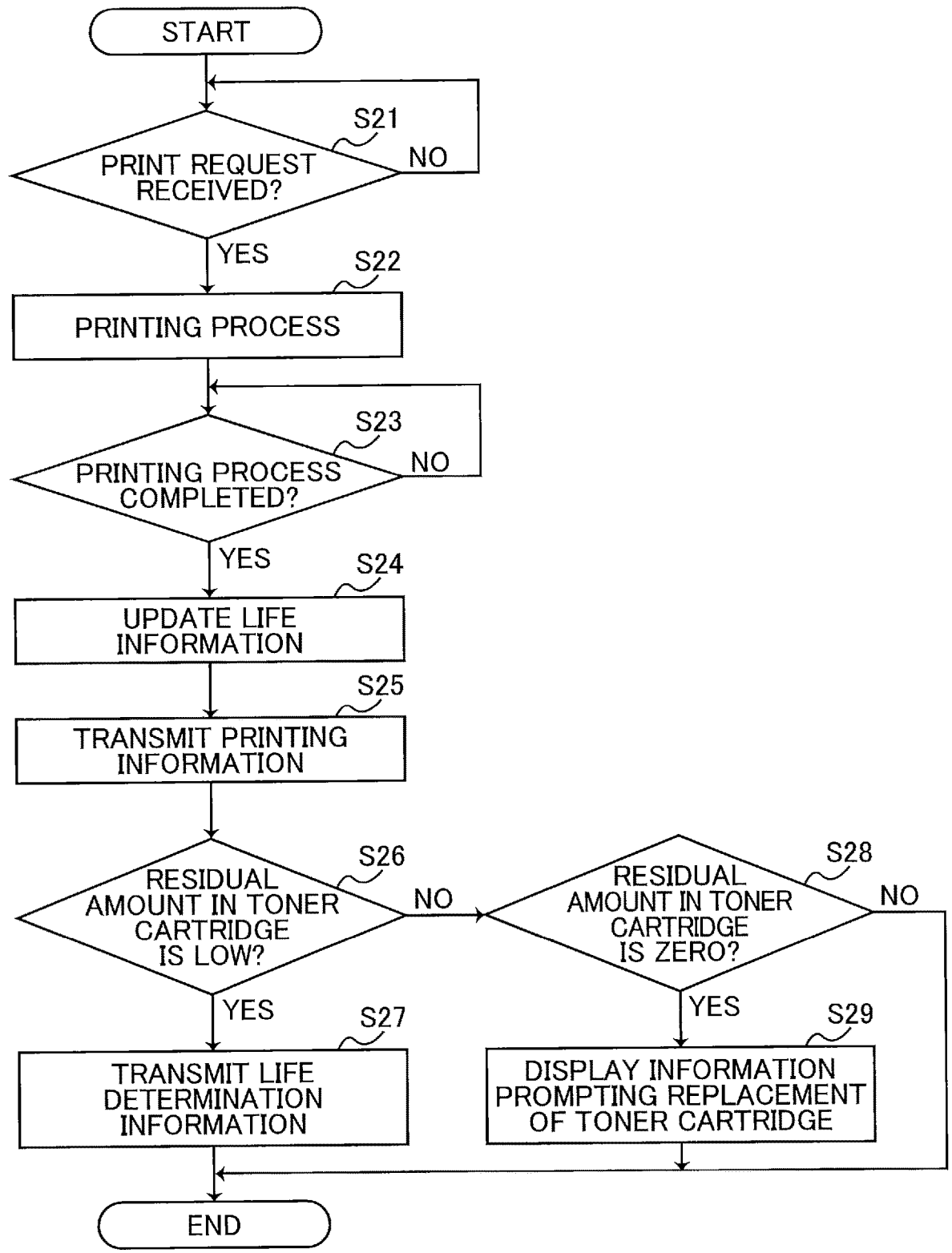
FIG. 8 is a flowchart illustrating steps in a process executed by the controller when the image forming apparatus according to the embodiment is in its formal contract mode.

Next, operations performed on the image forming system 100 will be described. FIG. 4 is a diagram illustrating a process executed in the image forming system 100 according to the present embodiment. FIG. 5 is a table illustrating an example of the management information 731. FIG. 6 is a flowchart illustrating steps in a process executed by the controller 51 when the operation mode is set to the normal mode. FIG. 7 is a flowchart illustrating steps in a process executed by the controller 51 when the operation mode is set to the pre-contract mode. FIG. 8 is a flowchart illustrating steps in a process executed by the controller 51 when the operation mode is set to the formal contract mode.

In the following description, steps executed in the image forming apparatus 1 are executed by the controller 51 unless otherwise specified. Steps executed in the contract management server 7 are executed by the controller 71 unless otherwise specified.

First, the user enters an agreement with the supplier. Specifically, the user operates the registration apparatus 8 to transmit an agreement request 401 to the contract management server 7 (an agreement request transmission process S100). The agreement request 401 may include information about the user wishing to enter the agreement (including the user's name, address, etc.), information about the agreement such as fees, information about payment, and device information for identifying the image forming apparatus 1 used by the user (device ID). Note that the user need not perform the agreement request transmission process S100 through the registration apparatus 8. For example, the user may transmit the agreement request 401 to the contract management server 7 through the image forming apparatus 1.

Upon receiving the agreement request 401, the contract management server 7 registers information included in the agreement request 401 as the management information 731 (a registration process S101). At this time, the contract management server 7 transmits a pre-contract mode setting command 403 to the image forming apparatus 1 that is the subject of the agreement (a pre-contract mode setting request process S102). The pre-contract mode setting command 403 is a command to the controller 51 provided in the image forming apparatus 1, ordering the controller 51 to switch the operation mode for the image forming apparatus 1 to the pre-contract mode. The image forming apparatus 1 that is the subject of the agreement, i.e., a destination for the pre-contract mode setting command 403, is identified based on the agreement request 401.

As illustrated in FIG. 5, the management information 731 stored in the storage unit 73 for each user includes device information, payment information, an address, an operation mode, and an accumulated printed page number for billing. The operation mode is a mode set for the image forming apparatus 1 and is either the pre-contract mode or the formal contract mode. The accumulated printed page number for billing is a value obtained by the accumulated number of printed pages received from the image forming apparatus 1.

As illustrated in FIG. 6, when the operation mode is set to the normal mode, in S11 the controller 51 determines whether a pre-contract mode setting command 403 is received (a determination process S11). When the controller 51 determines that a pre-contract mode setting command 403 is not received (S11: NO), the controller 51 waits until a pre-contract mode setting command 403 is received. When the controller 51 determines that a pre-contract mode setting command 403 was received (S11: YES), in S12 the controller 51 sets the operation mode to the pre-contract mode (a pre-contract mode setting process S12).

Thus, the pre-contract mode setting command 403 is information that the contract management server 7 transmits to the image forming apparatus 1 that is subjected to the agreement. In other words, the pre-contract mode setting command 403 is information specifying that an agreement is made for the image forming apparatus 1. The determination process S11 corresponds to a process in which the controller 51 determines whether an agreement is made for the image forming apparatus 1 based on the pre-contract mode setting command 403 received from an external device (the process of first determining).

Referring back to FIG. 4, after receiving the agreement request 401, the contract management server 7 also transmits a shipping request 405 to a shipping company, specifically, to a server of the shipping company (a shipping request process S105). The shipping request 405 is information requesting the shipping company to deliver a subscription toner cartridge 30 to the user. The shipping request 405 includes the user's name and address as the delivery destination.

Upon receiving the shipping request 405, the shipping company ships a new subscription toner cartridge 30 to the user (a shipping process S106). When the user receives the new subscription toner cartridge 30, the user can attach the new subscription toner cartridge 30 to the image forming apparatus 1 (an attachment process S107).

In S13 of FIG. 7, the controller 51 of the image forming apparatus 1 operating in the pre-contract mode determines whether the toner cartridge 30 is replaced (a replacement determination process S13). Specifically, the controller 51 determines that the toner cartridge 30 is replaced when detecting that the power was switched from off to on or when the sensor 12 detects that the cover 11 was moved between the closed position and the open position.

The controller 51 may also determine whether a toner cartridge 30 is replaced based on the toner ID of the attached toner cartridge 30. That is, the controller 51 may compare the toner information stored in the device memory 513 to the toner ID stored in the toner memory 32 of the toner cartridge 30 attached to the main casing 10. The controller 51 determines that the toner cartridge 30 was replaced when the toner information is different from the toner ID and determines that the toner cartridge 30 was not replaced when the toner information matches the toner ID.

When the controller 51 determines that the toner cartridge 30 was not replaced (S13: NO), the controller 51 repeats the determination in S13 until the toner cartridge 30 is replaced. On the other hand, when the controller 51 determines that the toner cartridge 30 was replaced (S13: YES) when operating in the pre-contract mode, in S14 the controller 51 determines the type of the toner cartridge 30 attached to the main casing 10. That is, the controller 51 determines whether the type of the toner cartridge 30 indicated by the type information is the normal type or the subscription type.

When the controller 51 determines that the toner cartridge 30 after replaced is the subscription type (S14: YES), in S15 the controller 51 sets the operation mode from the pre-contract mode to the formal contract mode (a formal contract mode setting process S15). Hence, when the user attaches a subscription toner cartridge 30 in the image forming apparatus 1 in the attachment process of S107 (see FIG. 4), the controller 51 determines that the attached toner cartridge 30 is a subscription toner cartridge 30 and shifts the operation mode to the formal contract mode.

After setting the operation mode to the formal contract mode in S15, in S16 the controller 51 notifies the contract management server 7 that the operation mode is set to the formal contract mode (a notification process S16). Upon receiving this notification, the contract management server 7 records information in the management information 731 indicating that the target image forming apparatus 1 now operates under the formal contract mode (a formal contract registration process S161). Specifically, the contract management server 7 changes the operation mode registered in the management information 731 for the image forming apparatus 1 whose operation mode is the formal contract mode from "pre-contract mode" to "formal contract mode."

On the other hand, when the controller 51 determines in S14 of FIG. 7 that the toner cartridge 30 after replacement is the normal type (S14: NO), in S17 the controller 51 performs a first display process to display on the display 55 display information relating to the pre-contract mode. Specifically, the display information includes a message indicating that a subscription toner cartridge 30 is now shipped. The displayed information also prompts the user to confirm whether to use the normal toner cartridge 30. By executing the first display process of S17, the controller 51 can prompt the user to use a subscription toner cartridge 30 (the subscription toner cartridge 30 shipped from the shipping company, for example).

As illustrated in FIG. 4, when the user wishes to the image forming apparatus in the formal contract mode to execute a printing process, the user issues a print request 407 to the image forming apparatus 1 (a print request process S201). In S21 of FIG. 8, the controller 51 of the image forming apparatus 1 now set to the formal contract mode determines whether a print request 407 was received. When the controller 51 determines that a print request 407 was not received (S21: NO), the controller 51 repeats the determination in S21 until a print request 407 is received from the user. When the controller 51 determines that a print request 407 was received (S21: YES), in S22 the controller 51 executes a printing process based on the received print request 407.

In S23 the controller 51 determines whether the printing process of S22 is completed. When determining in S23 that the printing process is not yet completed (S23: NO), the controller 51 waits until the printing process is completed. However, when the controller 51 determines that the printing process is completed (S23: YES), in S24 the controller 51 executes a life information update process to update toner life information in the toner information stored in the device memory 513 based on the contents of the printing process of S22.

Note that the controller 51 may perform the life information update process in S24 after the entire printing process is completed, or may perform the life information update process each time a portion of the printing process is completes, for example, after each page is printed. In the life information update process of S24, the controller 51 may also update toner life information in the toner memories 32 corresponding to the updated toner life information in the device memory 513. Here, toner life information in the toner memories 32 may be updated each time toner life information is updated in the device memory 513 or after toner life information is updated in the device memory 513 a plurality of times.

After completing the life information update process of S24, in S25 the controller 51 transmits printing information 409 to the contract management server 7 (a printing information transmission process). The printing information 409 is information representing the contents of the printing process executed in the image forming apparatus 1 in S22 and may include the device information for the image forming apparatus 1, the number of pages printed, and toner type information for the toner cartridge 30 used in the printing process.

As illustrated in FIG. 4, upon receiving the printing information 409, the contract management server 7 updates the management information 731 based on the printing information 409 (an update process S241). That is, when the toner cartridge 30 used in the printing process of S22 is the subscription type, the contract management server 7 adds the number of pages printed using the toner cartridge 30 to the "accumulated printed page number for billing" in the management information 731.

However, when the toner cartridge 30 used in the printing process of S22 is the normal type, the contract management server 7 does not update the management information 731. In this way, the contract management server 7 manages only pages printed using subscription toner cartridges 30 for billing.

The image forming apparatus 1 in the formal contract mode uses the subscription toner cartridge 30 for the printing process in S22. Consequently, printed page numbers transmitted to the contract management server 7 from the image forming apparatus 1 in the formal contract mode correspond to the usage amount of the subscription toner cartridge 30.

After completing the printing information transmission process in S25, in S26 the controller 51 determines whether a value of the toner life information stored in the device memory 513 matches a first threshold (a first life determination process S26). The first threshold is a threshold value specifying a state in which the remaining life stored in the toner memory 32 is very low. In other words, the first life determination process of S26 is performed to determine whether the remaining life of the toner cartridge 30 has become very low. For example, when the toner life information is a residual amount of toner in the casing 33, the first threshold is a value representing a small residual amount (i.e., a residual amount of toner in the toner cartridge 30 that is nearly empty).

When the controller 51 determines that the toner life information matches the first threshold (S26: YES), in S27 the controller 51 executes a life determination information transmission process S27 to transmit life determination information 411 to the contract management server 7. The life determination information 411 includes the device information for the image forming apparatus 1 and type information for the toner cartridge 30 whose toner life information matches the first threshold.

Upon receiving the life determination information 411, the contract management server 7 identifies the type of the toner cartridge 30 having low remaining life based on the life determination information 411. When the contract management server 7 identifies that the toner cartridge 30 is the subscription type, the contract management server 7 transmits a shipping request 413 to the shipping company, i.e., the server of the shipping company (a shipping request transmission process S271). The shipping request 413 is information requesting the shipping company to ship a new subscription toner cartridge 30 to the user. Specifically, the shipping request 413 includes information on the shipping destination (the user's name and address), and information indicating the type of the subscription toner cartridge 30 to be shipped (model number, etc.).

When receiving the shipping request 413, the shipping company ships a new subscription toner cartridge 30 to the user based on the shipping request 413 (a shipping process S272). Note that the shipping company may also be the supplier (vender or manufacturer, for example) of the toner cartridges 30.

In the image forming system 100 described above, the image forming apparatus 1 can transmit the life determination information 411 to the contract management server 7 in order that the user can receive a new subscription toner cartridge 30. The life determination information 411 corresponds to order information used to order a new subscription toner cartridge 30.

Note that the first life determination process in S26 may be executed by the contract management server 7. In this case, the controller 51 operating under the formal contract mode transmits the toner life information to the contract management server 7. Upon receiving the toner life information, the contract management server 7 determines whether the toner life information matches the first threshold and transmits the shipping request 413 to the server of the shipping company when determining that the toner life information matches the first threshold. In response, the shipping company ships a new toner cartridge 30 to the user.

Returning to FIG. 8, when the controller 51 determines in S26 that the toner cartridge 30 does not match the first threshold (S26: NO), in S28 the controller 51 executes a second life determination process in which the controller 51 determines whether the toner life information exceeds a second threshold. The second threshold is a threshold value indicating that the toner cartridge 30 has to be replaced with a new toner cartridge 30. Specifically, the second threshold indicates when the toner cartridge 30 has no remaining life.

In other words, the second life determination process of S28 is performed to determine whether the toner cartridge 30 must be replaced based on the toner life information. For example, when the toner life information specifies the residual amount of toner in the casing 33, the second threshold may be a value representing that the residual amount of toner is zero, i.e., a value indicating that the casing 33 is empty.

When the image forming apparatus 1 determines that the toner life information exceeds the second threshold (S28: YES), in S29 the controller 51 displays on the display 55 display information that includes a message indicating that the toner cartridge 30 must be replaced (a first replacement display process). Upon seeing the message displayed on the display 55 in the process of S29, the user can attach a new subscription toner cartridge 30, which was delivered to the user, to the main casing 10 (an attachment process S291). When the controller 51 determines that the toner life information does not exceed the second threshold (S28: NO), the controller 51 ends the process of FIG. 8.

Figure 9:
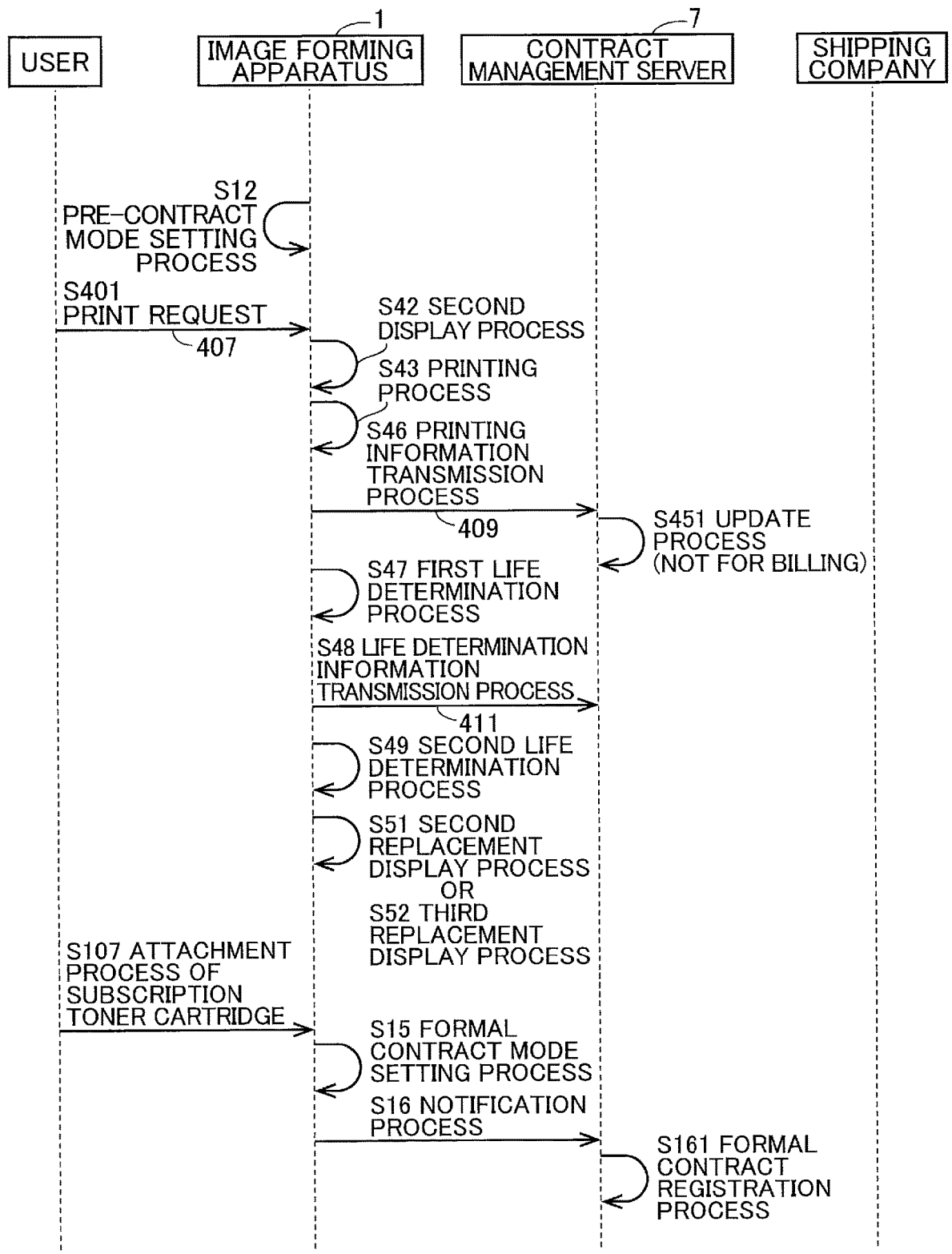
FIG. 9 is a sequence diagram illustrating another process executed in the image forming system according to the embodiment.
Figure 10:
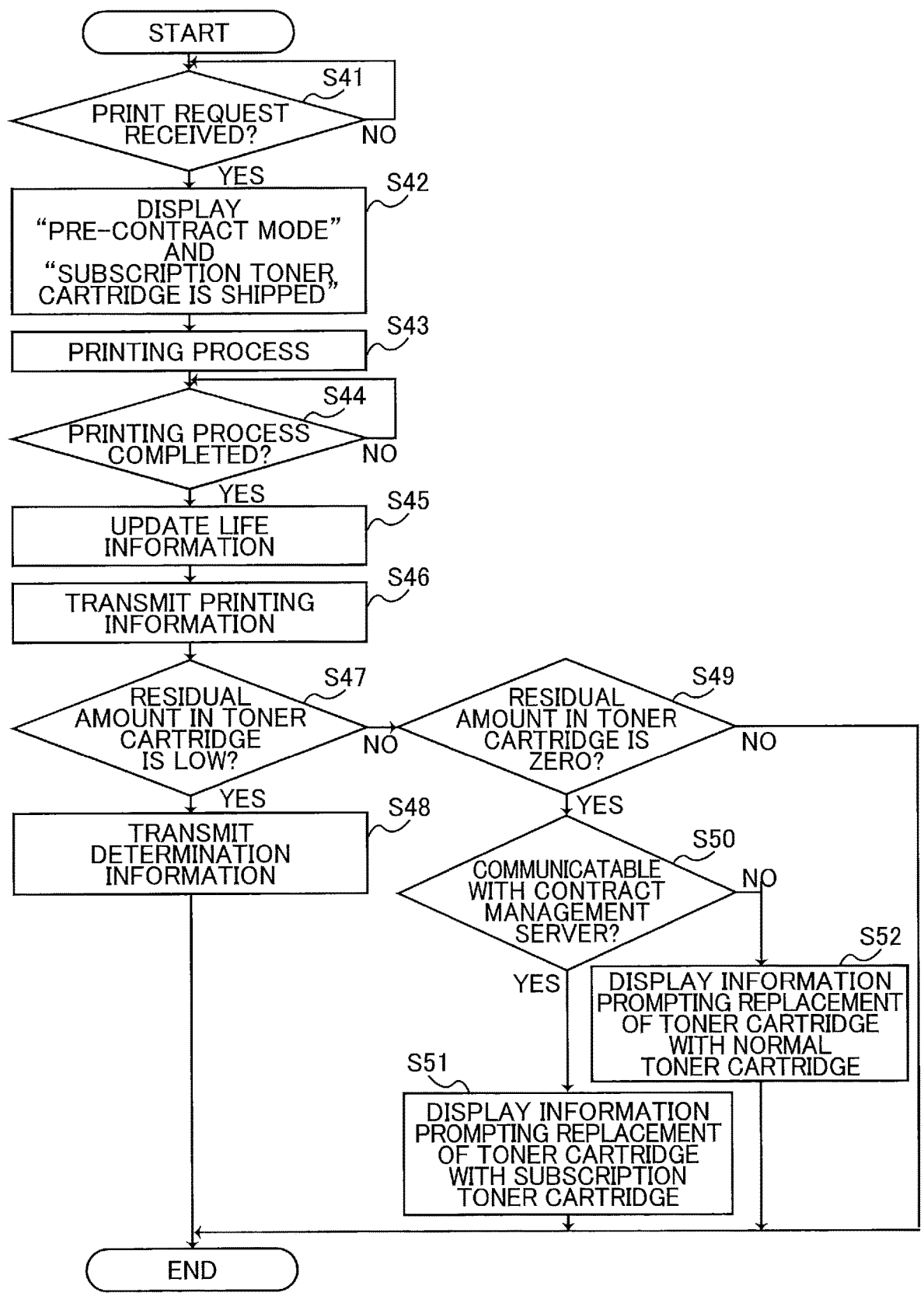
FIG. 10 is a flowchart illustrating steps in another process executed by the controller when the image forming apparatus according to the embodiment is in the pre-contract mode.

Next, a process performed on the image forming system 100 when the image forming apparatus 1 in the pre-contract mode performs a printing process will be described with reference to FIGS. 9 and 10. FIG. 9 is a diagram illustrating steps in the process executed in the image forming system 100. FIG. 10 is a flowchart illustrating steps in the process executed by the controller 51 when the image forming apparatus 1 is in the pre-contract mode.

As illustrated in FIG. 9, a user wishing to execute a printing process on the image forming apparatus 1 in the pre-contract mode issues a print request 407 to the image forming apparatus 1 (a print request process S401). In S41 of FIG. 10, the controller 51 of the image forming apparatus 1 in the pre-contract mode determines whether a print request 407 is received (a reception determination process).

When the controller 51 determines that a print request 407 is not received (S41: NO), the controller 51 waits until a print request 407 is inputted. On the other hand, when the controller 51 determines that a print request 407 was received (S41: YES), in S42 the controller 51 executes a second display process in which the controller 51 displays on the display 55 display information related to the pre-contract mode. The display information may include a message indicating that the image forming apparatus 1 is in the pre-contract mode. The display information may also include a message indicating that a new subscription toner cartridge 30 is now shipped.

The controller 51 continues to operate under the pre-contract mode as long as the normal toner cartridge 30 is attached to the main casing 10. When using the normal toner cartridge 30, the user can gain no benefits described in the agreement entered with the supplier. Thus, by executing the second display process in S42, the controller 51 prompts the user to attach a subscription toner cartridge 30. By using the subscription toner cartridge 30, the user can then receive the benefits of the agreement.

After completing the second display process of S42, in S43 the controller 51 executes a printing process based on the received print request 407. In S44 the controller 51 determines whether the printing process of S43 is completed (a print complete determination process S44). When the controller 51 determines that the printing process of S43 is not yet completed (S44: NO), the controller 51 repeats the determination in S44 until the printing process is completed. When the controller 51 determines that the printing process in S43 ended (S44: YES), in S45 the controller 51 executes a life information update process to update life information described in S24 of FIG. 8. That is, the controller 51 updates the toner life information in the toner information stored in the device memory 513 based on contents of the printing process in S43.

After updating the life information in the life information update process of S45, in S46 the controller 51 executes a printing information transmission process to transmit printing information 409 described in the printing information transmission process of S25 in FIG. 4 to the contract management server 7.

As illustrated in FIG. 9, upon receiving the printing information 409, the contract management server 7 updates the management information 731 based on the printing information 409 (an update process S451). The printing information 409 transmitted to the contract management server 7 indicates the number of pages printed using the normal toner cartridge 30. Here, the contract management server 7 does not add the number of printed pages specified by the printing information 409 to the "accumulated printed page number for billing". Consequently, all pages printed using the normal toner cartridge 30 are excluded from the management information 731 and only pages printed using the subscription toner cartridge 30 are subjected to billing.

Note that the controller 51 need not execute the printing information transmission process of S46 while the image forming apparatus 1 is in the pre-contract mode. In other words, the printing information transmission process of S46 may be omitted so that the controller 51 does not transmit the page numbers printed using the normal toner cartridge 30 to the contract management server 7. In this way, the contract management server 7 need only manage printed page numbers transmitted from the controller 51 in the process of S25 (see FIGS. 4 and 8) while the image forming apparatus 1 is in the formal contract mode.

After completing the printing information transmission process of S46 illustrated in FIG. 10, in S47 the controller 51 executes a first life determination process identical to that of S26 in FIG. 8 to determine whether the toner life information matches the first threshold. When the controller 51 determines that the toner life information matches the first threshold (S47: YES), the controller 51 executes a determination information notification process in S48.

Specifically, in S48 the controller 51 transmits life determination information 411 (see FIG. 9) to the contract management server 7. The life determination information 411 includes type information for the toner cartridge 30 whose toner life information was determined to match the first threshold. In this case, the type of the toner cartridge 30 indicated by the type information is the normal type.

Upon receiving the life determination information 411, the contract management server 7 determines that the type of the toner cartridge 30 whose life information matches the first threshold is the normal type based on the life determination information 411. Accordingly, the contract management server 7 does not execute the shipping request transmission process of S271 (see FIG. 4). Hence, a new subscription toner cartridge 30 is not transmitted to the user in this case. Note that the determination information notification process of S48 may be omitted when the controller 51 operates under the pre-contract mode.

On the other hand, when the controller 51 determines that the toner life information does not match the first threshold (S47: NO), in S49 the controller 51 executes a second life determination process described in S28 of FIG. 8. That is, the controller 51 determines whether the toner life information saved in the device memory 513 exceeds the second threshold.

When the controller 51 determines that the toner life information does not exceed the second threshold (S49: NO), the controller 51 ends the process of FIG. 10. On the other hand, when the controller 51 determines in S49 that the toner life information exceeds the second threshold (S49: YES), in S50 the controller 51 determines whether the image forming apparatus 1 can communicate with the contract management server 7. That is, the controller 51 performs a test to determine whether a response can be received from the contract management server 7 after transmitting prescribed information to the contract management server 7. When a response is received from the contract management server 7, the controller 51 determines that the controller 51 can communicate with the contract management server 7. When a response is not received, the controller 51 determines that the controller 51 cannot communicate with the contract management server 7.

When the controller 51 determines that communication with the contract management server 7 is possible (S50: YES), in S51 the controller 51 displays display information on the display 55 that includes a message prompting the user to replace the current toner cartridge 30 with a subscription toner cartridge 30 (a second replacement display process). On the other hand, when the controller 51 determines that communication with the contract management server 7 is not possible (S50: NO), in S52 the controller 51 displays on the display 55 display information including a message prompting the user to replace the current toner cartridge 30 with a new normal toner cartridge 30 (a third replacement display process).

As illustrated in FIG. 9, when the user views the message displayed in S51 and replaces the current toner cartridge 30 with a subscription toner cartridge 30 (an attachment process S107), the controller 51 operating under the pre-contract mode then executes S13-S15 described in FIG. 7. That is, in S13 the controller 51 determines whether the toner cartridge 30 was replaced, in S14 determines whether the type of toner cartridge 30 is the subscription type, and in S15 performs a process to change the operation mode to the formal contract mode.

Thus, as long as the image forming apparatus 1 can communicate with the contract management server 7, the contract management server 7 can manage the number of pages printed on the image forming apparatus 1 after the toner cartridge 30 is replaced with a subscription toner cartridge 30. On the other hand, when the image forming apparatus 1 cannot communicate with the contract management server 7, the contract management server 7 cannot manage numbers of pages printed using the subscription toner cartridge 30. Thus, the user is prompted to replace the empty toner cartridge 30 with a normal toner cartridge 30 so that the supplier can avoid loss incurred through the use of a subscription toner cartridge 30.

Note that the controller 51 may transmit toner information to the contract management server 7 as the printing information 409 whether the image forming apparatus 1 is in the pre-contract mode or the formal contract mode. The contract management server 7 may identify the accumulated printed page numbers from the toner life information for the subscription toner cartridge 30 included in the toner information and may record the identified accumulated printed page numbers in the management information 731. Accordingly, the contract management server 7 can still manage numbers of pages printed using the subscription toner cartridge 30.

The contract management server 7 may also identify the usage amount of the subscription toner cartridge 30 based on toner information received from the controller 51 as the printing information 409 and may record the identified usage amount in the management information 731. By managing the usage amount for the subscription toner cartridge 30 attached to the contracted image forming apparatus 1, the contract management server 7 can charge the user based on the usage amount.

When the contract management server 7 identifies the usage amount of the toner cartridge 30 received from the controller 51 operating under the pre-contract mode, the contract management server 7 may not record the identified usage amount of the toner cartridge 30 in the management information 731. Accordingly, the usage amount of the normal toner cartridge 30 used in the image forming apparatus 1 in the pre-contract mode are excluded from the management information 731, thereby excluding usage amount of the normal toner cartridges 30 from the subject of billing.

When toner information transmitted from the controller 51 operating under the formal contract mode represents that the type of the toner cartridge 30 is the normal type, the contract management server 7 also excludes the usage amount for the normal toner cartridge 30 from the management information 731. Accordingly, the contract management server 7 can exclude the usage amount for the normal toner cartridge 30 from the subject of billing.

2. Modifications

While the description has been made in detail with reference to the embodiment, it would be apparent to those skilled in the art that the present disclosure is not limited to the above-described embodiment and many modifications and variations may be made thereto.

The contract management server 7 is an example of a communication apparatus, but the communication apparatus is not limited to the contract management server 7 described in the embodiment. The communication apparatus may be a personal computer, a smartphone, a tablet computer, or other information terminal. The controller 51 of the image forming apparatus 1 may transmit order information (specifically, the life determination information 411) to the information terminal. In this case, the information terminal may transmit the order information to the contract management server 7. Further, e-mail may be used to perform data communications among apparatuses.

Although the image forming apparatus 1 is configured as a color printer in the embodiment and includes toner cartridges 30 for a plurality of colors, the image forming apparatus 1 may instead be a monochromatic printer. In this case, the image forming apparatus 1 includes a drum cartridge having a single photosensitive drum 21 that corresponds to a single toner cartridge 30.

The drum cartridge 20 may also be configured so that a plurality of toner cartridges 30 are attachable to a single drum cartridge 20. In this case, the single drum cartridge 20 includes a plurality of photosensitive drums 21 provided in one-on-one correspondence with the plurality of toner cartridges 30.

The image forming apparatus 1 may also be configured as a printer based on an inkjet recording method. In this inkjet printer, the supply cartridges are ink cartridges including casings that can accommodate ink therein. Alternatively, the supply cartridge may be a tape cassette that supplies tape as a printing material, or a fixing liquid cartridge that stores therein fixing liquid for fixing ink to a printing material.

In S12 of the above-described embodiment, the controller 51 of the image forming apparatus 1 changes the operation mode from the normal mode to the pre-contract mode when the controller 51 receives a pre-contract mode setting command 403 from the contract management server 7. As an alternative, the controller 51 of the image forming apparatus 1 may execute one of: (A) a process to set the operation mode from the normal mode to the formal contract mode upon receiving a contract setting command from the contract management server 7 in S12, and (B) a process to change the operation mode from the normal mode to the formal contract mode in S15 when determining that a newly attached toner cartridge 30 is a subscription toner cartridge 30 (S14: YES). In other words, the controller 51 of the image forming apparatus 1 may switch the operation mode from the normal mode to the formal contract mode when one of the conditions (A) and (B) is satisfied. In this case, the contract management server 7 is an example of a server, and the formal contract mode is an example of a contract mode.

While the description has been made in detail with reference to the present disclosure, the description is merely an example in all aspects and the present disclosure is not limited thereto. It would be apparent to those skilled in the art that many modifications and variations may be made therein without departing from the scope of the disclosure. Further, parts and components appearing in the embodiment and modifications may be suitably combined together and omitted as long as any conflicting structure is avoided.

What is claimed is:

1. An image forming apparatus comprising:
   a main casing;
   a supply cartridge attachable to the main casing, the supply cartridge including a supply cartridge memory storing therein type information indicative of a type of the supply cartridge which is one of a normal type and a subscription type;
   a printing mechanism configured to perform a printing process using the supply cartridge;
   a display; and
   a controller configured to perform processes in accordance with an operation mode for the image forming apparatus, the operation mode being configured to be set to one of a pre-contract mode and a formal contract mode, the controller being configured to perform:
first determining, based on information inputted into the controller, whether an agreement is made for the image forming apparatus;
first setting, when the first determining determines that an agreement is made for the image forming apparatus, the operation mode to the pre-contract mode;
second determining which of the normal type and the subscription type the type of the supply cartridge attached to the main casing is;
displaying, when the second determining determines that the type of the supply cartridge attached to the main casing is the normal type while the operation mode is set to the pre-contract mode, display information related to the pre-contract mode on the display; and
second setting, when the second determining determines that the type of the supply cartridge attached to the main casing is the subscription type while the operation mode is set to the pre-contract mode, the operation mode from the pre-contract mode to the formal contract mode.

2. The image forming apparatus according to claim 1, wherein the formal contract mode is an operation mode in which the controller performs processes based on the agreement made for the image forming apparatus, and
wherein the pre-contract mode is an operation mode in which the controller performs processes for setting the operation mode to the formal contract mode.

3. The image forming apparatus according to claim 1, wherein the controller is configured to further perform:
third determining whether the supply cartridge has been replaced, and
wherein, when the third determining determines that the supply cartridge is replaced while the operation mode is set to the pre-contract mode, the controller is configured to perform the second determining.

4. The image forming apparatus according to claim 1, wherein the controller is configured to further perform:
fourth determining whether a print request is received; and
displaying, when the fourth determining determines that a print request is received while the operation mode is set to the pre-contract mode, the display information related to the pre-contract mode on the display.

5. The image forming apparatus according to claim 1, wherein the display information related to the pre-contract mode includes information for prompting a user to use a supply cartridge of the subscription type.

6. The image forming apparatus according to claim 1, further comprising a communication interface configured to communicate with a communication apparatus,
wherein the controller is configured to further perform:
notifying, when the second setting sets the operation mode from the pre-contract mode to the formal contract mode, the communication apparatus that the operation mode is set to the formal contract mode.

7. The image forming apparatus according to claim 6, further comprising a device memory configured to store therein life information indicative of a remaining life of the supply cartridge,
wherein the controller is configured to further perform:
fifth determining, based on the life information stored in the device memory, whether the supply cartridge has to be replaced.

8. The image forming apparatus according to claim 7, wherein the controller is configured to further perform:
displaying, when the fifth determining determines that the supply cartridge has to be replaced while the operation mode is set to the pre-contract mode, display information for prompting replacement of the supply cartridge attached to the main casing with a new supply cartridge of the subscription type on the display.

9. The image forming apparatus according to claim 7, wherein the controller is configured to further perform:
sixth determining whether the image forming apparatus can communicate with the communication apparatus while the operation mode is set to the pre-contract mode;
displaying, when the sixth determining determines that the image forming apparatus can communicate with the communication apparatus and the fifth determining determines that the supply cartridge has to be replaced, display information for prompting replacement of the supply cartridge attached to the main casing with a new supply cartridge of the subscription type on the display; and
displaying, when the sixth determining determines that the image forming apparatus cannot communicate with the communication apparatus and the fifth determining determines that the supply cartridge has to be replaced, display information for prompting replacement of the supply cartridge attached to the casing with a new supply cartridge of the normal mode on the display.

10. The image forming apparatus according to claim 9, wherein the controller is configured to further perform:
transmitting the life information to the communication apparatus while the operation mode is set to the formal contract mode.

11. The image forming apparatus according to claim 9, wherein the controller is configured to further perform:
transmitting, based on the life information, order information to the communication apparatus while the operation mode is set to the formal contract mode, the order information being used for ordering a new supply cartridge.

12. The image forming apparatus according to claim 6, wherein the first determining determines whether an agreement is made for the image forming apparatus based on information transmitted from the communication apparatus.

13. The image forming apparatus according to claim 1, wherein the operation mode is configured to be set to one of the pre-contract mode, the formal contract mode, and a normal mode, and
wherein the controller is configured to further perform:
restricting, when the second determining determines that the type of the supply cartridge is the subscription type while the operation mode is set to the normal mode, use of the supply cartridge.

14. The image forming apparatus according to claim 13, wherein, in the restricting, the controller is configured to perform prohibiting use of the supply cartridge.

15. An image forming system comprising:
an image forming apparatus; and
a communication apparatus that can communicate with the image forming apparatus via an Internet,
the image forming apparatus comprising:
a main casing;
a supply cartridge attachable to the main casing, the supply cartridge including a supply cartridge memory storing therein type information indicative of a type of the supply cartridge which is one of a normal type and a subscription type;

a printing mechanism configured to perform a printing process using the supply cartridge;
a display;
a communication interface configured to communicate with the communication apparatus; and
a controller configured to perform processes in accordance with an operation mode for the image forming apparatus, the operation mode being configured to be set to one of a pre-contract mode and a formal contract mode,
wherein the communication apparatus is configured to perform:
transmitting to the controller agreement information indicating that an agreement is made for the image forming apparatus, and
wherein the controller is configured to perform:
setting, based on the agreement information received from the communication apparatus, the operation mode to the pre-contract mode;
first determining which of the normal type and the subscription type the type of the supply cartridge attached to the main casing is;
displaying, when the first determining determines that the type of the supply cartridge attached to the main casing is the normal type while the operation mode is set to the pre-contract mode, display information related to the pre-contract mode on the display; and
setting, when the first determining determines that the type of the supply cartridge attached to the main casing is the subscription type while the operation mode is set to the pre-contract mode, the operation mode from the pre-contract mode to the formal contract mode.

16. The image forming system according to claim 15, wherein the image forming apparatus further includes a device memory configured to store therein life information indicative of a remaining life of the supply cartridge,
wherein the communication apparatus includes a storage unit configured to store therein information related to a usage amount of the supply cartridge as management information, the usage amount of the supply cartridge being an amount by which the supply cartridge has been used in the image forming apparatus,
wherein the controller is configured to further perform:
first transmitting the life information stored in the device memory to the communication apparatus while the operation mode is set to the formal contract mode, and
wherein the communication apparatus is configured to further perform:
identifying the usage amount of the supply cartridge based on the life information transmitted from the controller.

17. The image forming system according to claim 16, wherein the controller is configured to further perform:
second transmitting the life information stored in the device memory to the communication apparatus while the operation mode is set to the pre-contract mode, and
wherein the communication apparatus is configured to further perform:
excluding, when the life information is transmitted from the controller in the second transmitting, the usage amount of the supply cartridge indicated by the life information from the management information.

18. The image forming system according to claim 16, wherein the controller is configured to further perform:

third transmitting, based on the life information, order information to the communication apparatus while the operation mode is set to the formal contract mode, the order information being used for ordering a new supply cartridge, and
wherein the communication apparatus is configured to further perform:
ordering, based on the order information transmitted from the controller in the third transmitting, a new supply cartridge.

19. A method of controlling an image forming apparatus configured to form an image using a supply cartridge, the method comprising:
first determining whether an agreement is made for the image forming apparatus;
setting, when the first determining determines that an agreement is made for the image forming apparatus, an operation mode for the image forming apparatus to a pre-contract mode;
second determining which of a normal type and a subscription type a type of the supply cartridge attached to the image forming apparatus is;
displaying, when the second determining determines that the type of the supply cartridge attached to the image forming apparatus is the normal type while the operation mode is set to the pre-contract mode, display information related to the pre-contract mode on a display; and
setting, when the second determining determines that the type of the supply cartridge attached to the image forming apparatus is the subscription type while the operation mode is set to the pre-contract mode, the operation mode for the image forming apparatus from the pre-contract mode to a formal contract mode.

20. An image forming apparatus comprising:
a main casing;
a supply cartridge attachable to the main casing, the supply cartridge including a supply cartridge memory storing therein type information indicative of a type of the supply cartridge which is one of a normal type and a subscription type;
a printing mechanism configured to perform a printing process using the supply cartridge; and
a controller configured to perform processes based on an operation mode set for the image forming apparatus, the operation mode being configured to be set to one of a normal mode and a contract mode,
the controller being configured to perform one of:
setting the operation mode from the normal mode to the contract mode based on a command received from a server via a network; and
setting the operation mode from the normal mode to the contract mode based on the type information stored in the supply cartridge memory of the supply cartridge attached to the main casing.

21. A method of controlling an image forming apparatus configured to form an image using a supply cartridge, the method comprising:
performing one of:
setting an operation mode for the image forming apparatus from a normal mode to a contract mode based on a command received from a server via a network; and
setting the operation mode for the image forming apparatus from the normal mode to the contract mode based on type information indicative of a type of the supply cartridge which is one of a normal type or a subscription type.

\* \* \* \* \*